(12) United States Patent  (10) Patent No.: US 9,331,574 B2
Kurokawa                    (45) Date of Patent:     May 3, 2016

(54) CONTROLLER OF THE POWER INVERTER CIRCUIT AND A CONTROL METHOD

(75) Inventor: Fujio Kurokawa, Nagasaki (JP)

(73) Assignee: NAGASAKI UNIVERSITY, NATIONAL UNIVERSITY CORPORATION, Nagasaki-Shi, Nagasaki (JP)

( * ) Notice: Subject to any disclaimer, the term of this patent is extended or adjusted under 35 U.S.C. 154(b) by 921 days.

(21) Appl. No.: 12/935,832

(22) PCT Filed: Feb. 28, 2009

(86) PCT No.: PCT/JP2009/053773
§ 371 (c)(1),
(2), (4) Date: Jan. 25, 2011

(87) PCT Pub. No.: WO2009/122833
PCT Pub. Date: Oct. 8, 2009

(65) Prior Publication Data
US 2011/0181260 A1    Jul. 28, 2011

(30) Foreign Application Priority Data

Mar. 31, 2008 (JP) ................. 2008-094408

(51) Int. Cl.
*H03M 1/12* (2006.01)
*H02M 3/157* (2006.01)
*H02M 1/00* (2006.01)
*H02M 3/156* (2006.01)

(52) U.S. Cl.
CPC ...... *H02M 3/157* (2013.01); *H02M 2001/0012* (2013.01); *H02M 2003/1566* (2013.01)

(58) Field of Classification Search
USPC ................... 341/155; 323/282–283
See application file for complete search history.

(56) References Cited

U.S. PATENT DOCUMENTS

| 7,456,620 | B2* | 11/2008 | Maksimovic et al. | 323/283 |
| 7,956,592 | B2* | 6/2011 | Morroni et al. | 323/283 |
| 8,148,965 | B2* | 4/2012 | Takahashi | 323/283 |
| 8,319,486 | B2* | 11/2012 | Maksimovic et al. | 323/283 |

FOREIGN PATENT DOCUMENTS

JP    02-262868 A    10/1990
JP    2007-325365 A   12/2007

* cited by examiner

*Primary Examiner* — Khai M Nguyen
(74) *Attorney, Agent, or Firm* — Kile Park Reed & Houtteman PLLC

(57) ABSTRACT

A highly accurate control is achieved in such a way that a timing value is generated from a differential control amount calculation result and a filter calculation result at iteration intervals not exceeding the iteration intervals of the filter calculation and then the timing set value of a driving signal generation circuit is updated by this timing value. A device for controlling a power conversion circuit comprises an AD conversion circuit (22), a driving timing value generation circuit (23), and a driving signal generation circuit (24). The driving timing value generation circuit (23) includes a control amount calculation circuit (231) and a digital-digital addition circuit (232). The digital-digital addition circuit (232) generates a driving timing value for a switch of a power conversion circuit. The driving signal generation circuit (24) receives the driving timing value and generates a driving signal for the switch (11) of the power conversion circuit (1).

8 Claims, 21 Drawing Sheets

Fig. 12
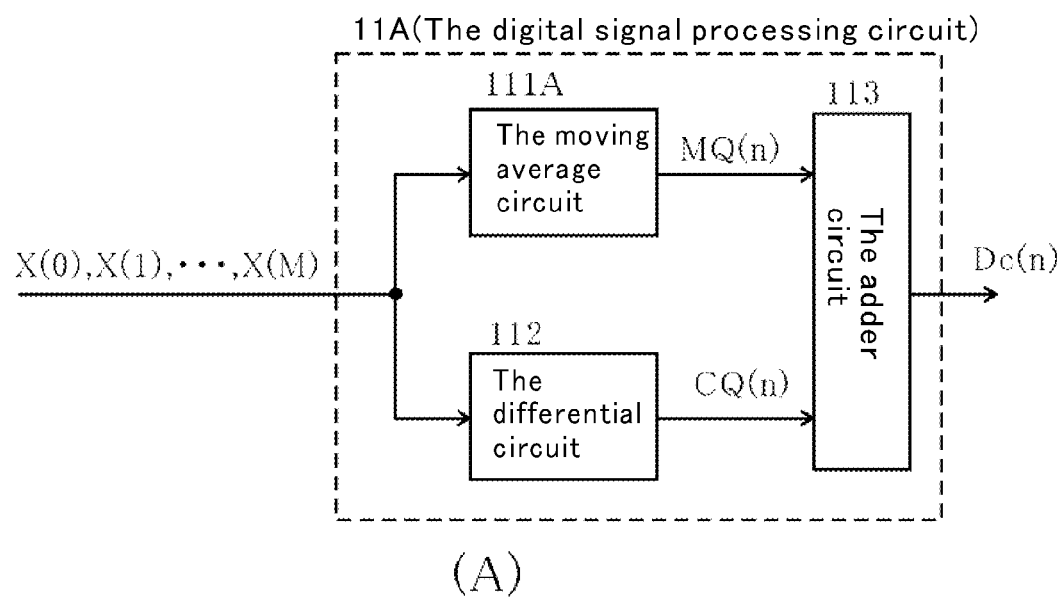
(A)
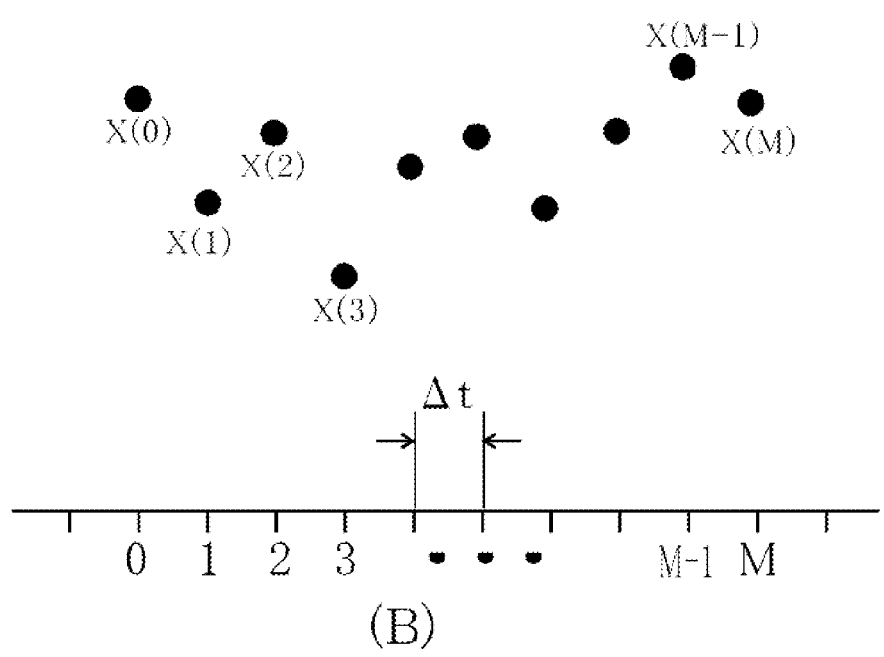
(B)

Fig. 13
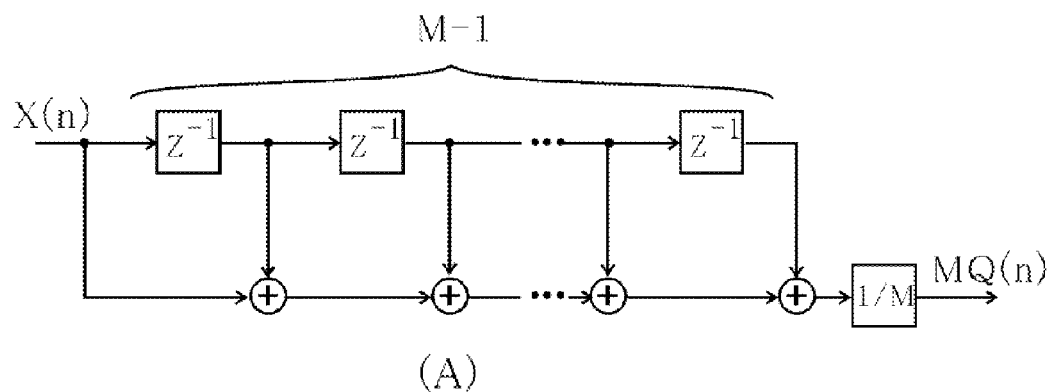
(A)
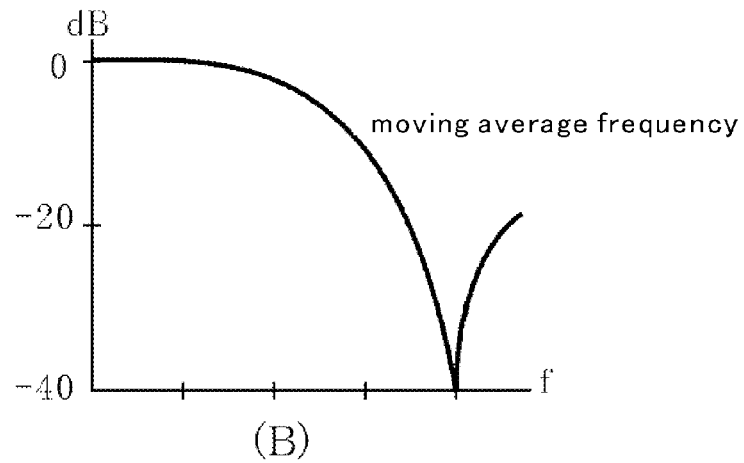
(B)
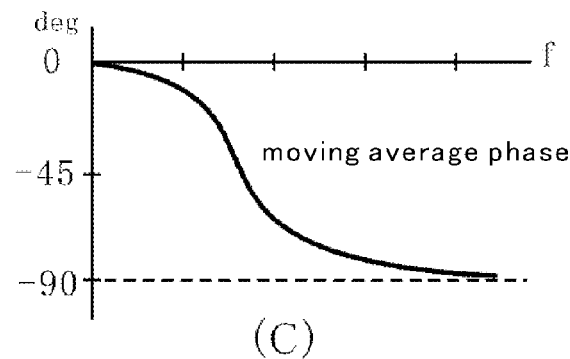
(C)

Fig. 14
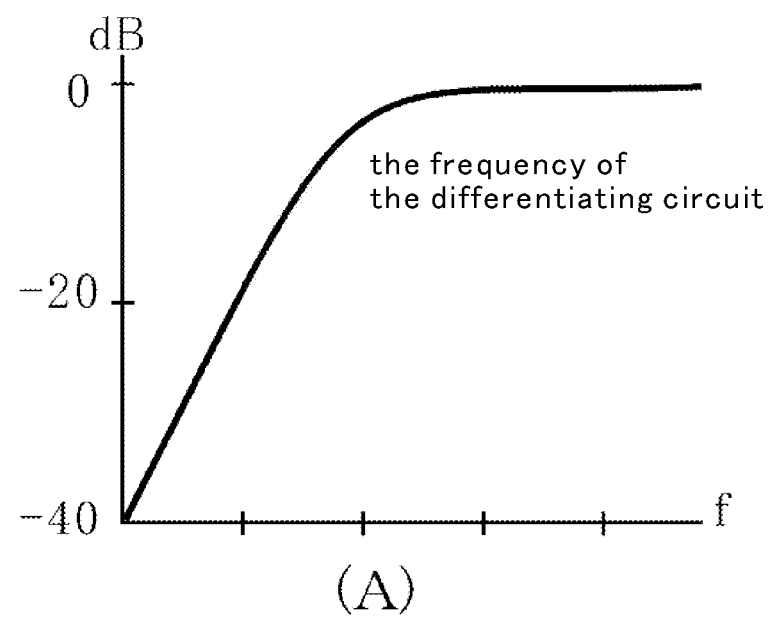
(A)
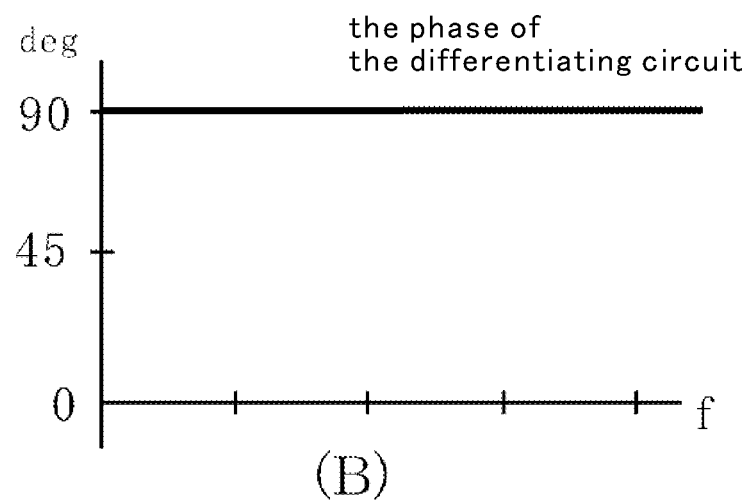
(B)

Fig. 19
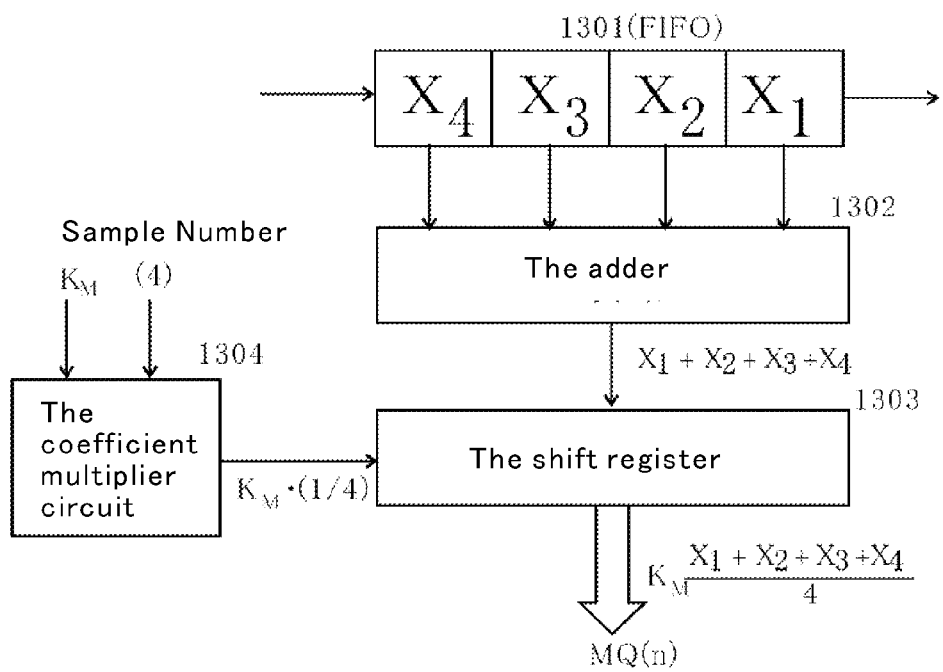
(A)
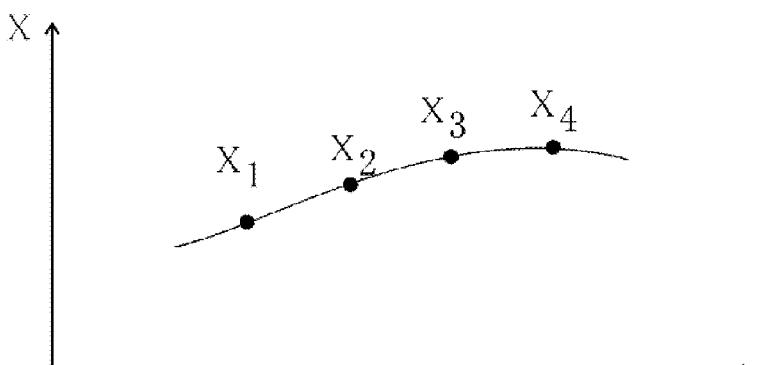
(B)

Fig. 21
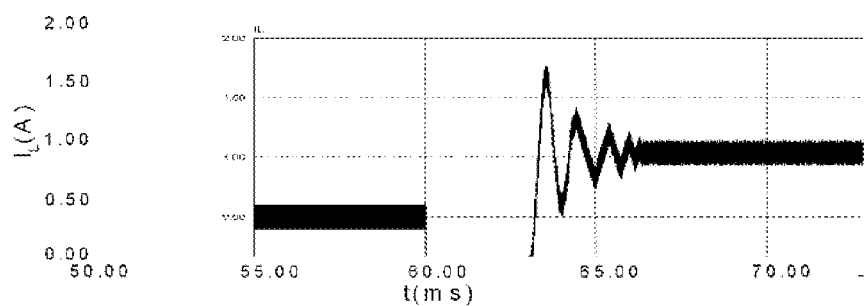
(A)
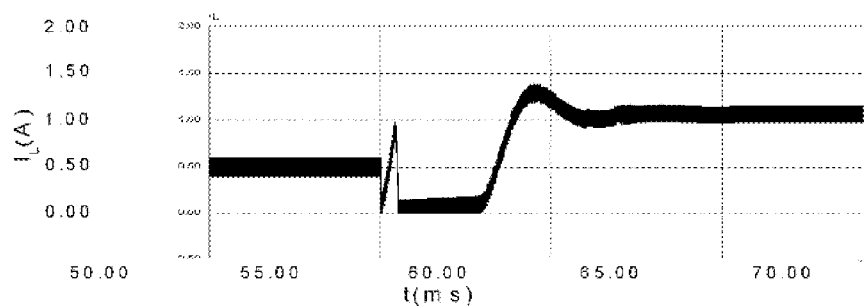
(B)

CONTROLLER OF THE POWER INVERTER CIRCUIT AND A CONTROL METHOD

A FIELD OF THE INVENTION

The present invention relates to a technique to control a power inverter circuit with high accuracy.

BACKGROUND-ART

The controller of the conventional power inverter circuit is described by FIG. 11. In FIG. 11, when the switch 81 is on, the power converter circuit 8 supplies electric power from the power supply 101 to the load 102 through the electric the reactor 82. When the switch 81 is off, the power converter circuit 8 emits energy saved to the reactor 82. Thereby, electric power is supplied to the load 102.

Note that, in FIG. 11, an output side of the power converter circuit 8 is provided with the smoothing capacitor 84.

The controller 9 of the power converter circuit 8 is comprised of the A/D converter circuit 91, the drive timing value generation circuit 92 and the driving signal generation circuit 93.

The A/D converter circuit 91 inputs output voltage $e_o$ of the power converter circuit 8, and converts an input signal into a digital signal.

The A/D converter circuit 91 outputs converted digital signals to the drive timing value generation circuit 92.

The calculation result D in the drive timing value generation circuit 92 is sent out to the driving signal generation circuit 93. The driving signal generation circuit 93 generates a control signal (switch driving signal DSW) based on the calculation result D, and drives the switch 81 by this control signal.

SUMMARY OF THE INVENTION

A Problem to be Solved by the Invention

However, in the power converter circuit 8 of FIG. 11, a filter may be used for the drive timing value generation circuit 92. In this case, the power converter circuit 8 cannot support sudden changes of input voltage, input current, load voltage, load current. That is, when current power supply voltage, power supply current (the digital adder circuit or current flowing the power supply 101), load voltage or load current (terminal voltage of the load 102 or current supplied to the load 102) suddenly changed, the power converter circuit 8 cannot do appropriate control.

The purpose of the present invention is intended that high accuracy of the control achieves becoming by generating a driving signal in the repetition interval which is shorter than repetition interval of the filter calculation. In other words, the present invention is intended to cope with the sudden change of a power supply and the load fast.

In the present invention, timing value (signal for switch control) set in driving signal generation circuit is updated by short spacing.

A Means for Solving Problem

A controller of the power converter circuit comprising the A/D converter circuit, the drive timing value generation circuit and the driving signal generation circuit,
wherein,
the A/D converter circuit acquires analog signals one or two or more that are necessary for control from the power converter circuit, performs AD conversion of these analog signals, and the digital signals (digital values) one or two or more corresponding to these analog signals are generated,
the driving signal generation circuit is the control variable calculation circuit and the digital adder circuit,
the control variable calculation circuit comprises the second arithmetic logical unit performing the first arithmetic logical unit and the filter calculation performing differentiation controlled variable arithmetic, each arithmetic logical unit inputs digital amounts above one or two or more, respectively, and each arithmetic is performed,
the digital adder circuit adds the controlled variable that the controlled variable that the second arithmetic logical unit generated and the first above arithmetic logical unit generated, and generates drive timing value of the switch of the above power converter circuit, in repetition interval having a shorter than the repetition interval in the second arithmetic logical unit for longer than the repetition interval in the first arithmetic logical unit,
the driving signal generation circuit inputs the drive timing value, and a driving signal (driving pulse) of the above switch is generated by the drive timing value.

The first arithmetic logical unit can perform differentiation controlled variable arithmetic. Even more particularly, the first arithmetic logical unit can perform differentiation controlled variable arithmetic and proportion controlled variable arithmetic.

The filters can be classified in FIR (finite impulse response filter) and IIR filter (infinite impulse response filter). The finite impulse response filter includes moving average filter as is known.

The first arithmetic logical unit performs proportional control arithmetic, derivative control arithmetic or proportional control arithmetic and derivative control arithmetic, and the second arithmetic logical unit can perform filter calculation.

The power converter circuit is typically the DC/DC converter comprising a switch (or switches), a rectifier diode (or rectifier diodes) and reactor (or reactors).

The analog signals one or two or more which are necessary for control are typically the following electric parameter.
Input current of the power converter circuit,
input voltage,
output current,
output voltage,
an appointed point of the power converter circuit current flowing,
the predetermined voltage between two places of the power converter circuit The drive timing value generation circuit can generate the rising of the driving signal, a driving signal of the falling.

For example, the drive timing value generation circuit generates a timing of the rising of the driving signal in constant interval, and the timing of the falling can be controlled. Alternatively, the drive timing value generation circuit generates a timing of the falling of the driving signal in constant interval, and a timing of the rising can be controlled.

For example, two sets can be used in a group of the control variable calculation circuit, the digital adder circuit and the driving signal generation circuit. In this case, two groups can use an A/D converter circuit in common. The control variable calculation circuit can control a timing of the rising of the driving signal or a timing of the falling.

By a controller of the present invention, one of the rising of the driving signal or the falling is generated, and, by a conventional controller, the other of the rising of the driving signal or the falling can be generated.

The driving signal generation circuit can comprise a down counter.

When the drive timing set value was updated newly, by the next expression, a counter value can be renewed.

(an update level of the drive timing set value)−(accumulation count value until the present)

The accumulation count value until the present can be known by establishing the counter counting accumulated value, and it can be known by input number of times of the drive timing value.

Also, drive timing set value before it is updated is memorized, and it can be known by subtracting a down counter value from this set level.

When next-style value became the predetermined range, at update of the drive timing set value, (when, e.g., it became a zero in data processing or the negative) can generate a driving signal of the rising of the driving signal or the falling promptly.

(an update level of the drive timing set value)−(accumulation count value until the present)

For example, it is assumed that arithmetic repetition interval of the second arithmetic logical unit is an integral multiple of the arithmetic repetition interval of the first arithmetic logical unit.

When an arithmetic end timing of the second arithmetic logical unit agreed in an arithmetic end timing of the first arithmetic logical unit, the digital adder circuit can add differentiation controlled variable arithmetic logical unit to time generating a controlled variable.

When the arithmetic repetition interval of the second arithmetic logical unit is an integral multiple of the arithmetic repetition interval of the first arithmetic logical unit.

And when the arithmetic repetition interval of the second arithmetic logical unit is not an integral multiple of the arithmetic repetition interval of the first arithmetic logical unit, together, the counter value of a counter comprised in the driving signal generation circuit by an arithmetic end timing of the first arithmetic logical unit and the arithmetic end timing of the second arithmetic logical unit can be updated.

Note that each calculation result is usually stored by temporary memory (data buffer etc.) when the calculation result of the first arithmetic logical unit and the second arithmetic logical unit is added. This temporary memory can be provided in the first arithmetic logical unit and the second arithmetic logical unit, and it can be made for the digital adder circuit.

An Effect of the Invention

Specifically, on the occasion of generation of the timing value for electric switch control, the timing value is generated in repetition interval having a shorter than repetition interval of the filter calculation, based on the calculation result of the differentiation controlled variable and the calculation result of the filter.

The timing set value of the driving signal generation circuit is updated by this timing value.

Becoming is thereby planned high accuracy of the control. In the present invention, when a timing signal is generated, from calculation result of calculation result of the first arithmetic logical unit and the second arithmetic logical unit, timing value can be generated in predetermined interval.

This predetermined interval is interval having a shorter than the arithmetic repetition interval of the second arithmetic logical unit for longer than the arithmetic repetition interval of the first arithmetic logical unit.

The drive timing value set in driving signal generation circuit is updated by this timing value.

It can cope with a sudden change of the power supply voltage, power supply voltage, power supply voltage, load voltage, load current etc. in comparison with a conventional controller fast, and the high accuracy can be thereby controlled.

BRIEF DESCRIPTION OF DRAWINGS

FIG. 12 (A) is an illustration showing one embodiment of the digital circuit of the present invention.

FIG. 12 (B) is an illustration showing a digital signal (discrete values).

FIG. 13 (A) is a block diagram of moving average circuit.

FIG. 13 (B) is an illustration showing an example of a frequency characteristic of a moving average circuit.

FIG. 13 (C) is an illustration showing an example of a phase characteristic of a moving average circuit.

FIG. 14 (A) is an illustration diagram of an example of a frequency characteristic of differentiating circuit.

FIG. 14 (B) is an illustration diagram of an example of a phase characteristic of differentiating circuit.

FIG. 19 (A) is a configuration of a circuit operating moving average.

FIG. 19 (B) is an illustration of four sampling values.

FIG. 21 (A) is a diagram of a transient characteristic of a reactor current when a power converter circuit was simulated with a PID controller.

FIG. 21 (B) is a diagram of a transient characteristic of a reactor current when a power converter circuit was simulated with a digital control circuit.

THE BEST MODE FOR CARRYING OUT THE INVENTION

Figure 1:
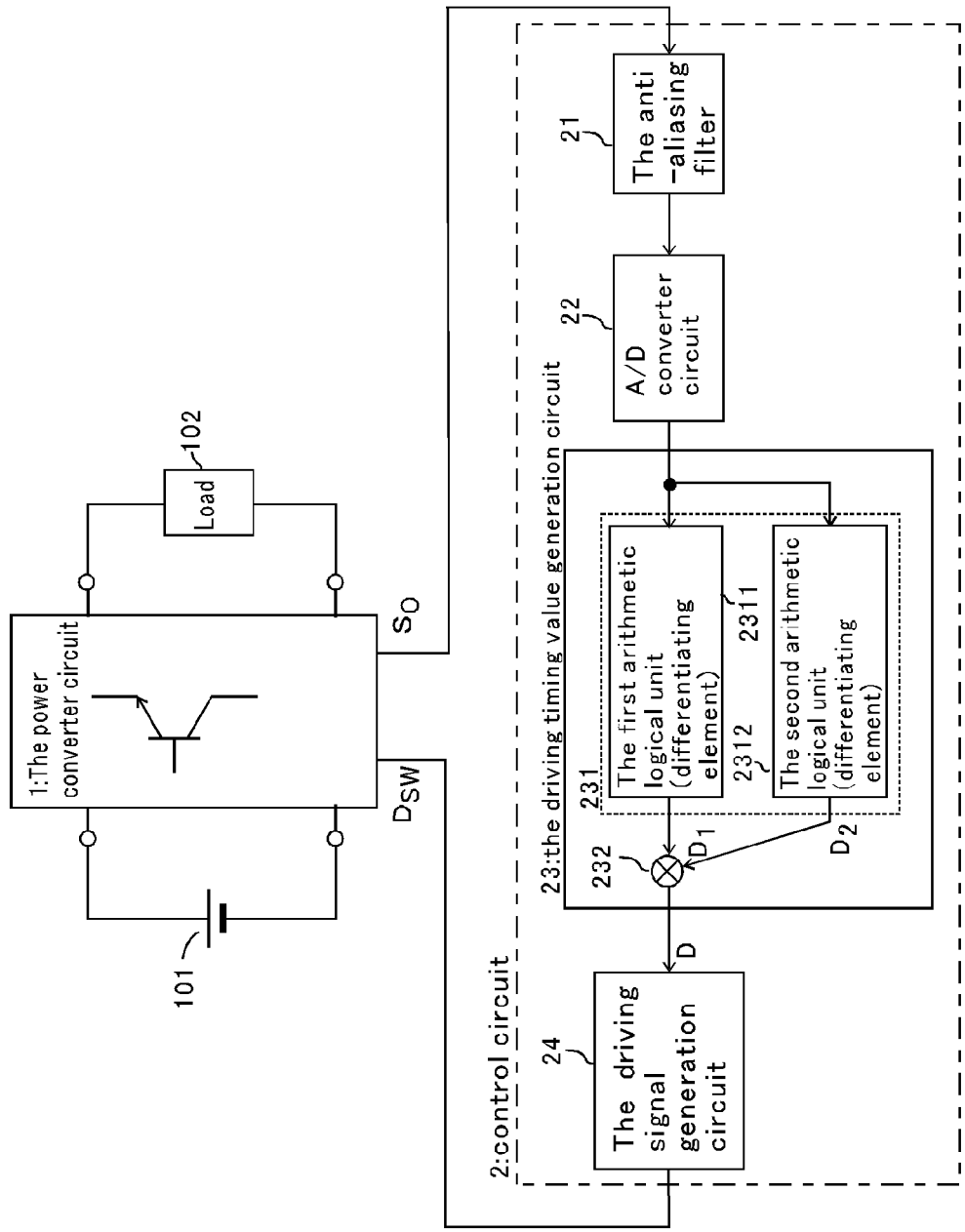
FIG. 1 is a configuration diagram which shows the first embodiment of the controller of the present invention.

The power converter circuit 1 receives electric power from the DC power supply 101, and supplies to load 102 in FIG. 1.

The controller 2 controls switch comprising the power converter circuit 1 by PWM (pulse duration modulation). The controller 2 is comprised of the anti-aliasing filter 21, The A/D converter circuit 22, the drive timing value generation circuit 23 and the driving signal generation circuit 24.

It is low pass filter, and the anti-aliasing filter 21 cuts noise (ripples) of signal So in input the power converter circuit 1.

For example, signal So is
input voltage of the power converter circuit 1,
input current of the power converter circuit 1,
output voltage of the power converter circuit 1,
output current of the power converter circuit 1,
switch current to drift to the switch comprising the power converter circuit 1,
reactor current to drift to the reactor comprising the power converter circuit 1.

Signal So which passed the anti-aliasing filter 21 is input, and A/D converter circuit 22 converts this into a digital signal.

The driving timing value generation circuit 23 becomes from the control variable calculation circuit 231 and the digital adder circuit 232.

The control variable calculation circuit 231 becomes the first the arithmetic logical unit 2311 from the second arithmetic logical unit 2312. The first the arithmetic logical unit 2311 operates the differentiation controlled variable, and the second arithmetic logical unit 2312 operates the filter.

The first arithmetic of the arithmetic logical unit 2311 and the arithmetic of the second arithmetic logical unit 2312 may be performed to cereal (or parallel) by microprocessor.

Alternatively, the first arithmetic of the arithmetic logical unit 2311 and the arithmetic of the second arithmetic logical unit 2312 may be performed in a parallel (or serial) by DSP.

The digital adder circuit 232 adds the calculation result D2 of the first calculation result D1 of the arithmetic logical unit 2311 and the second arithmetic logical unit 2312, and timing signal D (=D1+D2) is generated.

The digital adder circuit 232 can add the above in predetermined interval.

The predetermined interval is shorter than arithmetic repetition interval of the second arithmetic logical unit 2312, and the predetermined interval of the above is equal with arithmetic repetition interval in proportion controlled variable arithmetic logical unit PRP, besides.

Figure 2:
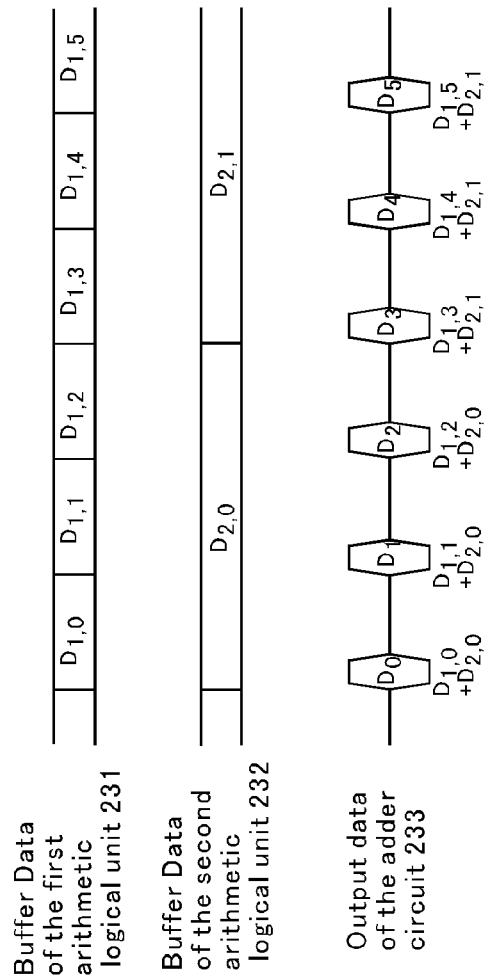
FIG. 2 is an illustration showing a control device behavior of the present invention.

For example, as shown in FIG. 2, it is supposed that arithmetic repetition interval of the second arithmetic logical unit 2312 is an integral multiple of the arithmetic repetition interval of the first the arithmetic logical unit 2311.

In this case, when calculation finished timing (when setup to output calculation result was set) of the second arithmetic logical unit 2312 accords in calculation finished timing of the first the arithmetic logical unit 2311, the digital adder circuit 232 can be added in the time that differentiation controlled variable arithmetic logical unit generated a controlled variable, In FIG. 2, it is shown differentiation controlled variable data in the first the arithmetic logical unit 2311 in D1, x (x; ..., 0, 1, 2, ...).

Also, it is shown the arithmetic data of the filter in the second arithmetic logical unit 2312 in D1, y (y; ..., 0, 1, 2, ...).

Even more particularly, it is shown output data of the digital adder circuit 232 in D (z) (z; ..., 0, 1, 2, ...).

Also, value C (it agrees with output data D (z) of the digital adder circuit 232) of the counter which the driving circuit generation circuit 24 does not illustrate can be put together, and it is shown.

In FIG. 2 the digital adder circuit 232 adds the differentiation controlled variable data of the first the arithmetic logical unit 2311 ($D_{1,x}$) and the arithmetic data of the filter of the second arithmetic logical unit 2312 ($D_{2,y}$).

D (zero)=$D_{1,0}$+$D_{2,zero}$
D (1)=D1, 1+D2, 0D (2)=D1, 2+D2, zero

. . .

D (5)=D1, 5+D2, 1

. . .

Note that, in the example, the example which stored each calculation result of the first the arithmetic logical unit 2311 and the second arithmetic logical unit 2312 to the temporary memory (data buffers) in each arithmetic logical unit was shown.

However, a data buffer is made for the digital adder circuit 232, and this data buffer can store each calculation result at one time.

The driving signal generation circuit 24 works in the present embodiment in repetition interval TSW.

The driving signal generation circuit 24 generates a control signal (switch driving signal DSW: in a falling timing of the driving pulse) based on timing signal D, and switch of the power converter circuit 1 is controlled.

The first the arithmetic logical unit 2311 or the second arithmetic logical unit 2312 may not use all data which have been sent from A/D converter circuit 22.

For example, the first the arithmetic logical unit 2311 may use only continuing two in a beginning among eight consecutive data which have been sent from A/D converter circuit 22. Also, the second arithmetic logical unit 2312 may use only the data of the even number joint among 1,024 consecutive data.

In such case, in the first the arithmetic logical unit 2311 or the second arithmetic logical unit 2312, data can be selected.

Figure 3:
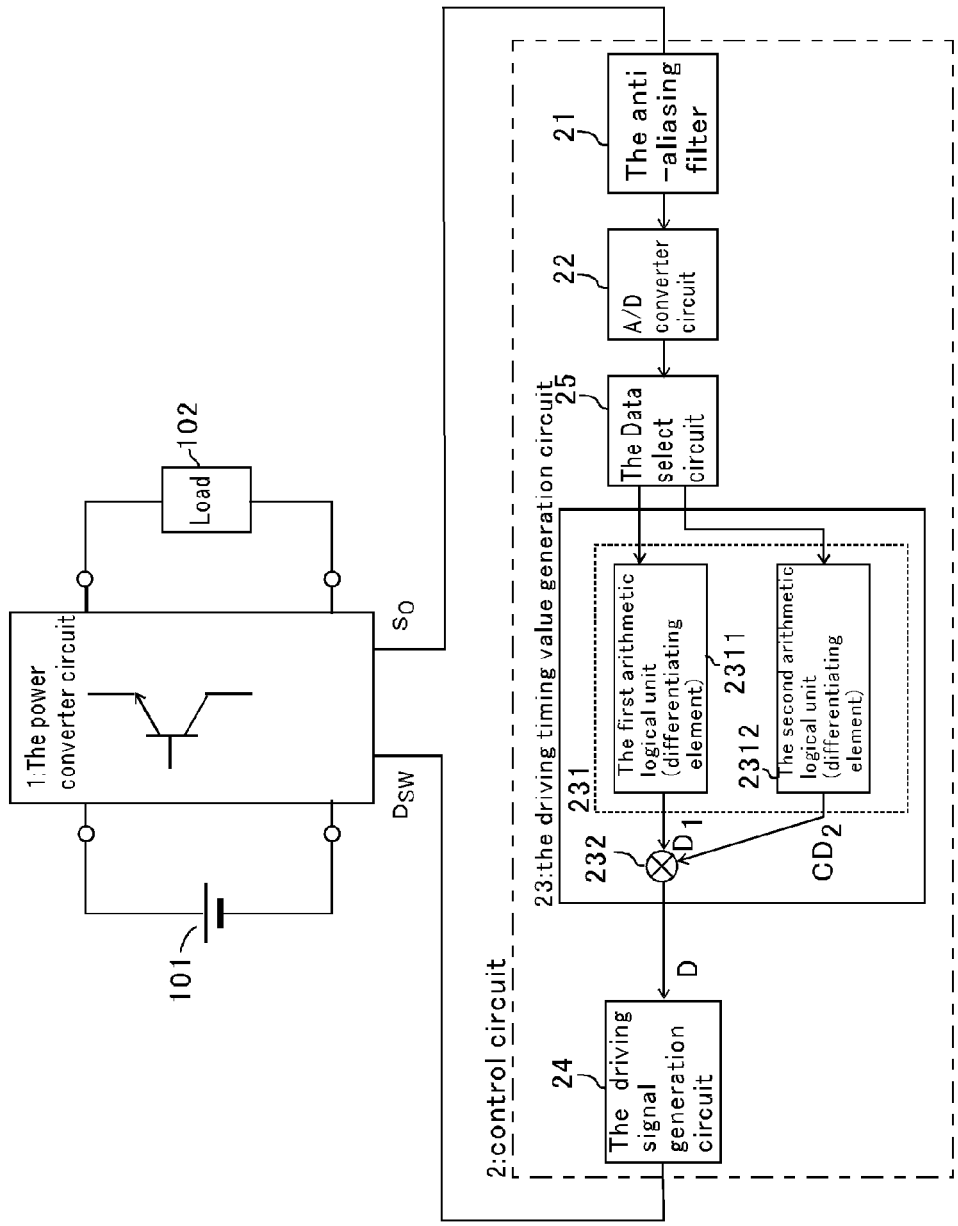
FIG. 3 is a configuration diagram which shows a variation of a controller of FIG. 1.

Also, as shown in FIG. 3, data selective circuit 25 can be made after A/D converter circuit 22.

As for data selective circuit 25, the first the arithmetic logical unit 2311 and the second arithmetic logical unit 2312 can output digital data output from A/D converter circuit 22.

This output depending on the repetition interval of each arithmetic logical unit (the first the arithmetic logical unit 2311 or the second arithmetic logical unit 2312)

Figure 4:
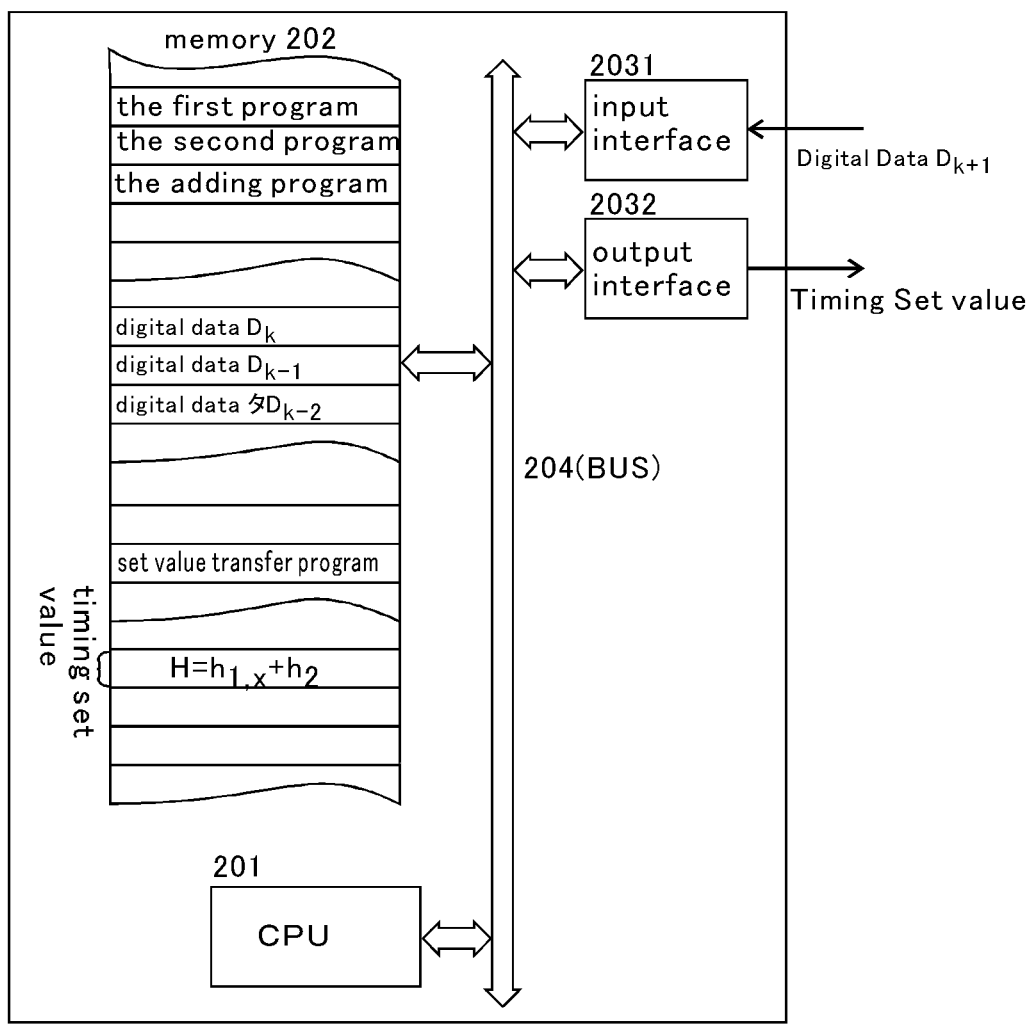
FIG. 4 is an illustration which watched a part of a controller for hardware.
Figure 5:
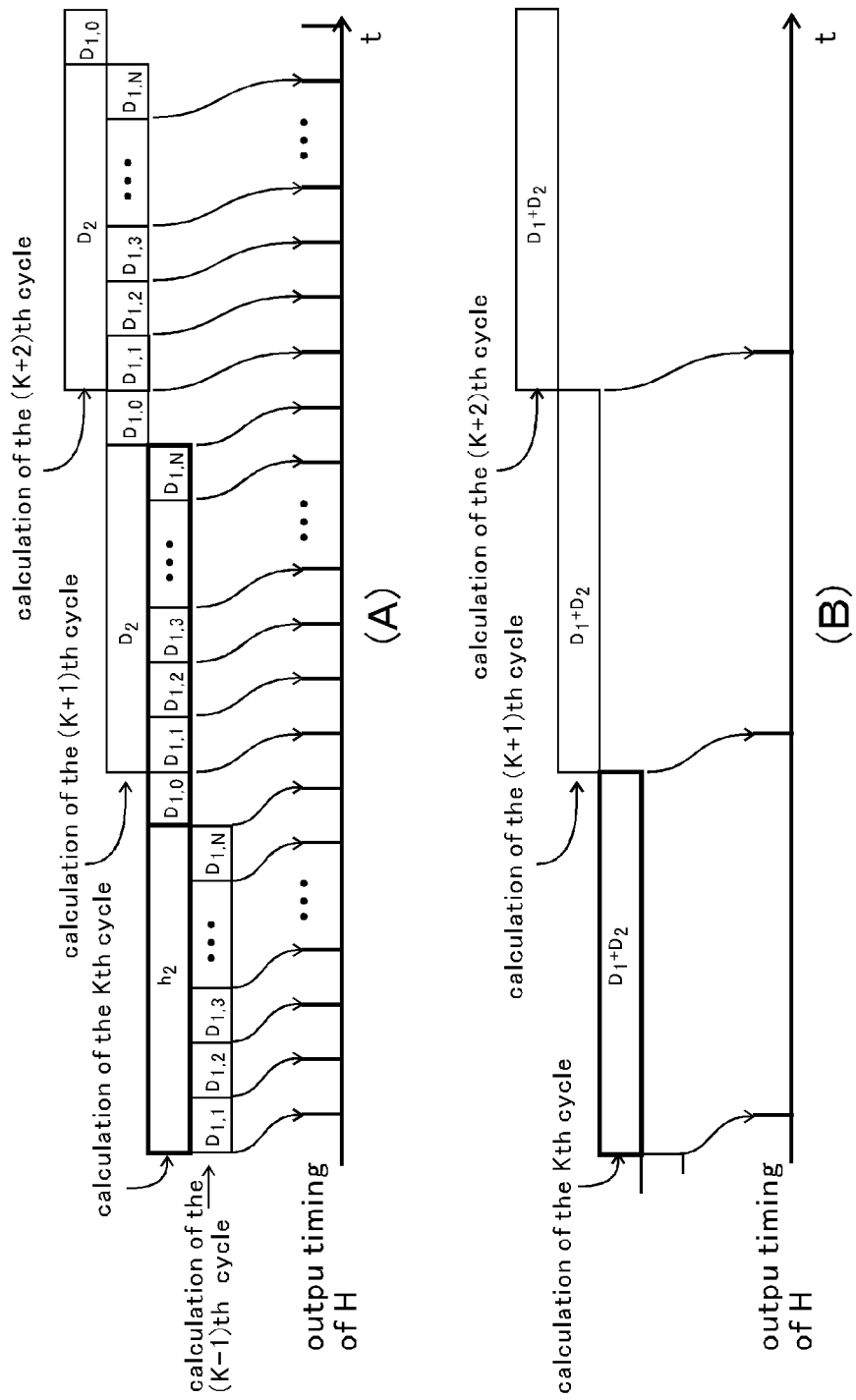
FIG. 5 (A) is an illustration diagram showing a behavior of a control device of a power converter circuit of FIG. 1, and FIG. 5 (B) is a control device behavior illustration of the conventional power converter circuit.

An operation example of the controller 2 shown in FIG. 1 by FIGS. 4 and 5 is described.

FIG. 4 is an illustration which shows an example of the controller 2.

In FIG. 4, drive timing value generation circuit has output interface 2032 and bus 204 with CPU201 and memory 202 and input interface 2031.

In FIG. 4, it is shown drive timing value generation circuit by the configuration of a traditional computer such as FIG. 4 in convenience of the explanation.

Note that CPU201 and memory 202 of the drive timing value generation circuit is available to the driving signal generation circuit 24.

In FIG. 4, the digital data from A/D converter circuit 22 are stored in the data saved-area of memory 202. In memory 202, a plurality of data are stored by a FIFO method. In FIG. 4, three latest data Dk−2, Dk−1, Dk are stored, and the state that data Dk+1 is input into is shown in input interface 2031. Also, in FIG. 4, the state that timing set value is output is shown from output interface 2032.

In FIG. 4, the function of the driving timing value generation circuit 23 is accomplished by "first arithmetic program and second arithmetic program" stored in memory 2302 and CPU2301.

In FIG. 4, a differentiation arithmetic program "is the first arithmetic program", and a filter calculation program "is the second arithmetic program".

The differentiation program can be assumed "the first arithmetic program", and it can be done with "the second arithmetic program".

Also, the updated timing value is transferred to the driving signal generation circuit 24 by a set level transport agent.

As shown in FIG. 5 (A), the first the arithmetic logical unit 2311 performs multiple arithmetic in repetition interval by the second arithmetic logical unit with the driving timing value generation circuit 23.

FIG. 5 (B) shows drive timeliness in before.

In FIG. 5 (A), D1 of eyes, 1, D1, 2, . . . , D1, the arithmetic of N are performed with arithmetic of D2 of eyes concurrently in k+1 period in k period.

A set level includes a down counter made subtrahend to the driving signal generation circuit 24 by a predetermined clock. The set level of the down counter is updated sequentially by timing value H.

For example, it is assumed that an initial set level of the down counter "is 512".

When it was downed to "400", and it was counted (a remainder number of counts:) It is assumed (i.e., "4" wants to be risen) that "112"), set level were updated to "516".

The driving signal generation circuit 24 can have the counter which can count accumulated value separately. In this case, this counter value "is 400".

Thus, value of "516−400=116" is set in a down counter.

As for the driving signal generation circuit 24, memory can store a set level before the update ("512"). In this case, accumulated value can be calculated by subtracting value "112" of the down counter from set level "512" before the update. Thus, value of "516−(512−112)=116" is set in a down counter.

When the value of the down counter became the zero in data processing, the driving signal generation circuit 24 turns off switch of the power converter circuit 1 by driving signal DSW.

Note that, in this example, switch is turned off, but switch is turned on, and the above can be controlled.

Figure 6:
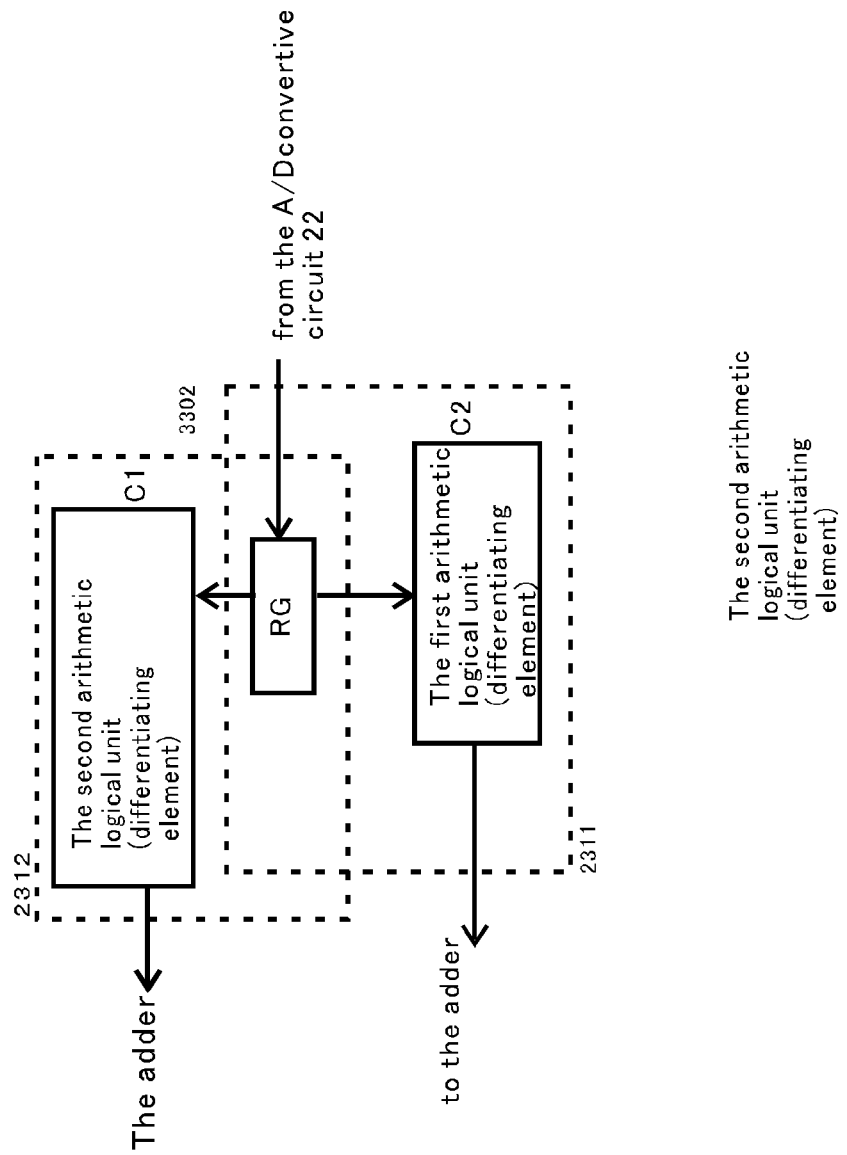
FIG. 6 is a figure which shows an example of a unification circuit with a data selective circuit and a drive timing value generation circuit, when a data selective circuit comprises a register.

FIG. 6 is a figure which shows a unification circuit example with data selective circuit and the drive timing value generation circuit when data selective circuit 25 is comprised by register RG, In FIG. 6, the data from A/D converter circuit 22 are stored by register RG.

When the data of the N unit can be memorized, and new data are input into the data of these N units, register RG is pushed sequentially, and it is erased sequentially by old data.

Two data (e.g., 2 data latest) are sent to the first arithmetic logical unit C2 among data stored by register RG.

The first arithmetic logical unit C2 calculates difference, and a predetermined coefficient is multiplied by calculation result, and this multiplication result is output by a digital adder.

All data stored by register RG are sent to the second arithmetic logical unit C1.

Filter calculation processes all data (e.g., FIR arithmetic, the moving average arithmetic are processed), and the second arithmetic logical unit C1 sends calculation result to the adder.

The first arithmetic logical unit C2 (differentiation controlled variable arithmetic logical unit) demands a differentiation controlled variable using two latest adjacent data, and, however, the present invention is not limited to this method.

For example, the first arithmetic logical unit C2 can use two data which do not continue input from A/D converter circuit 22.

Figure 7:
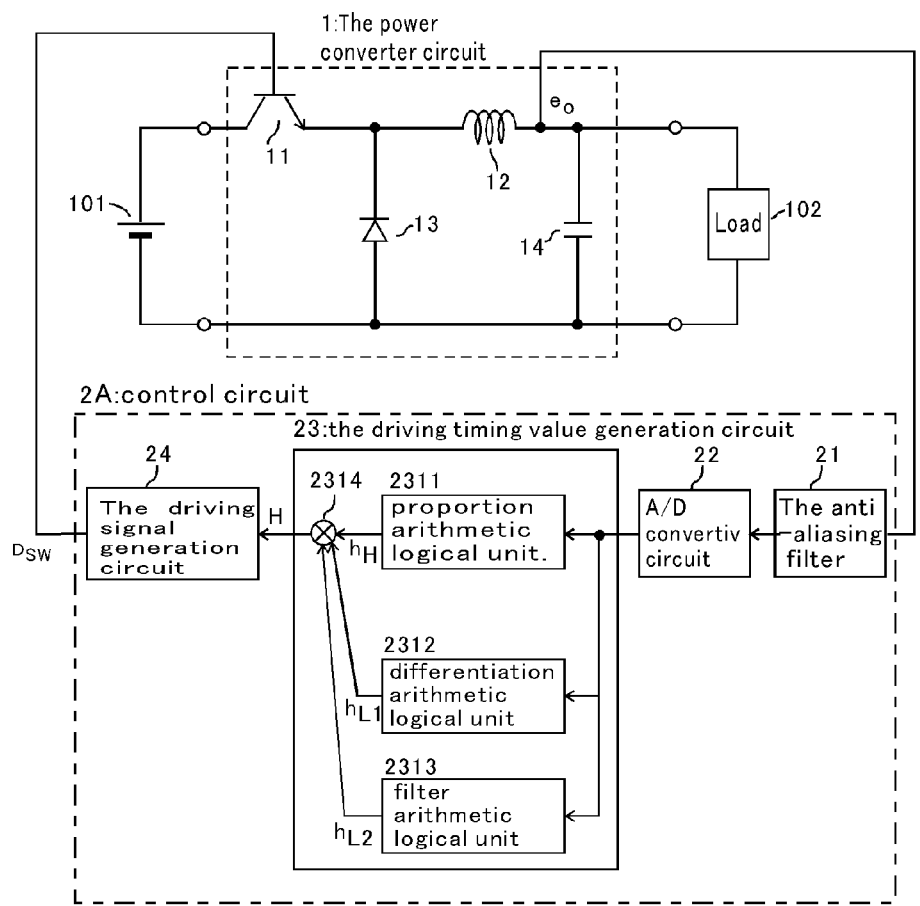
FIG. 7 is a configuration diagram which shows the second embodiment of the controller of the present invention.

Second embodiment of the present invention is described by FIG. 7.

FIG. 7 is a configuration diagram of the controller 2 of the present invention, and the configuration of the power converter circuit 1 is the same as the power converter circuit 1 (reference such as FIG. 1) shown in first embodiment.

Also, like first embodiment, the controller 2 controls switch 11 by PWM in the second embodiment.

As for the controller 2, it is the anti-aliasing filter 21 from A/D converter circuit 22 and the driving timing value generation circuit 231 and the driving signal generation circuit 24.

The anti-aliasing filter 21, A/D converter circuit 22 and the driving signal generation circuit 24 is almost similar that it illustrated by first embodiment.

Note that, in FIG. 7, (before the driving timing value generation circuit 231) is not provided with data selective circuit after A/D converter circuit 22, and, however, the data selective circuit described in FIG. 3 after A/D converter circuit 22 can be provided.

In FIG. 7, the driving timing value generation circuit 231 consists of proportion the arithmetic logical unit 2311, differentiation arithmetic logical unit 2312, filter arithmetic logical unit 2313 and the digital adder circuit 2314.

The digital adder circuit 2314 adds output signal hH of proportion the arithmetic logical unit 2311, output signal hL1 of differentiation controlled variable arithmetic logical unit 2312 and output signal hL2 of filter arithmetic logical unit 2313.

The digital adder circuit 2314 outputs these output signals to the driving signal generation circuit 24 as timing signal H.

The arithmetic in proportion the arithmetic logical unit 2311 is accomplished with high-speed.

The operation speed in filter arithmetic logical unit 2313 is slower than operation speed in proportion the arithmetic logical unit 2311 markedly.

The operation speed in differentiation controlled variable arithmetic logical unit 2312 is not fast as arithmetic in proportion the arithmetic logical unit 2311, but it is not late as arithmetic in filter arithmetic logical unit 2313.

According to the present invention, the digital adder circuit 2314 adds arithmetic data in arithmetic data and filter arithmetic logical unit 2313 in arithmetic data and differentiation arithmetic logical unit 2312 in proportion the arithmetic logical unit 2311 in repetition interval or more in lower than of filter arithmetic logical unit 2313 repetition interval and proportion the arithmetic logical unit 2311.

Figure 8:
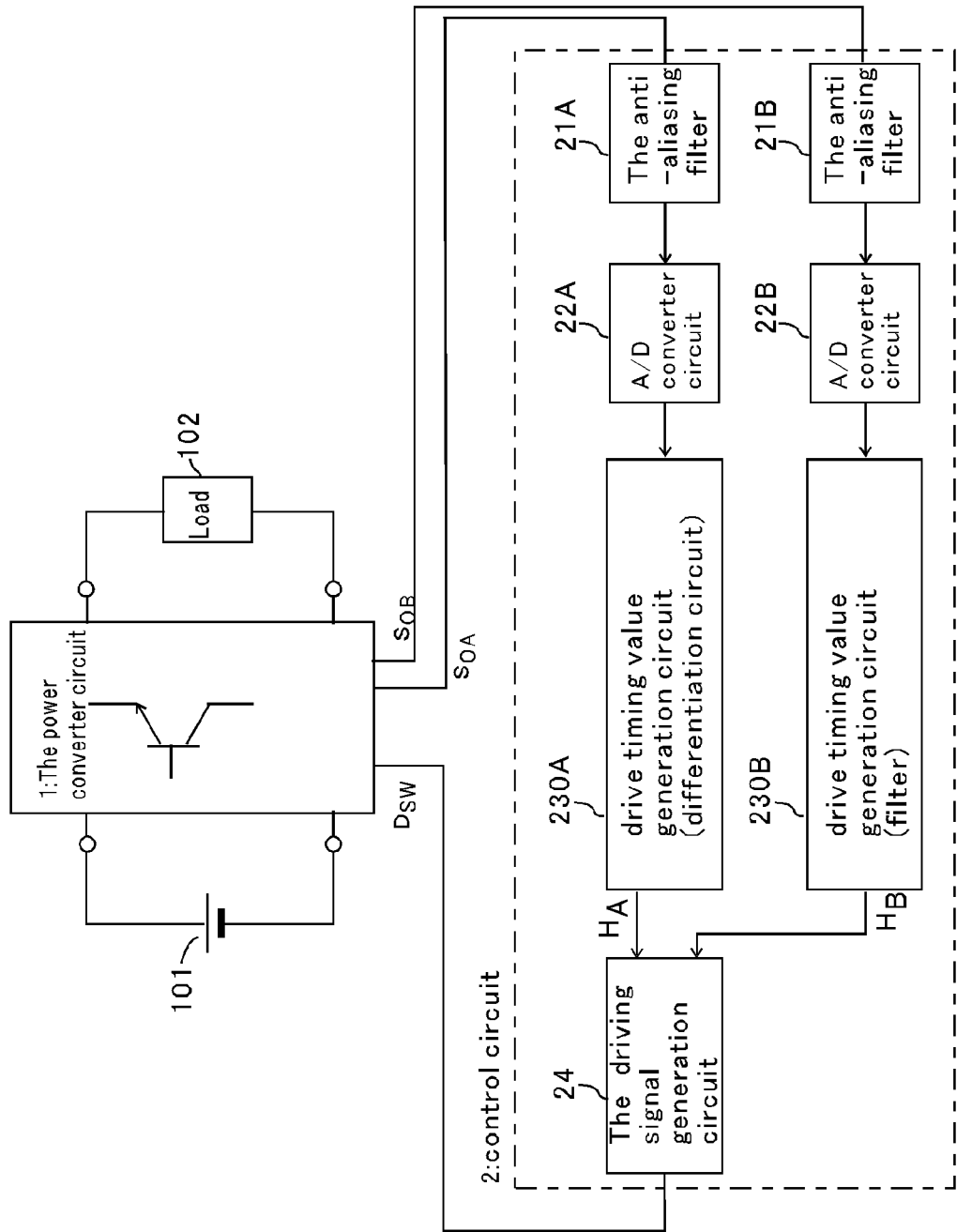
FIG. 8 is a configuration diagram which shows the controller which acquires two necessary analog signals and executes control.

FIG. 8 is a figure which shows a configuration example of the control circuit 2. The control circuit 2 acquires two analog signals that are necessary for control from the power converter circuit 1.

For example, one of two analog signals is output voltage of the power converter circuit 1.

For example, the other of two analog signals is current flowing in switch of the power converter circuit 1.

In FIG. 8, the anti-aliasing filter consists of the anti-aliasing filter 21A, 21B with the control circuit 2. The A/D converter circuit consists of translate circuit 22A, 22B. The data selective circuit consists of selective circuit 25A, 25B.

Also, in FIG. 8, the drive timing value generation circuit consists of the control variable calculation circuit 231A and 231B.

In the control circuit 2 of FIG. 8, A/D converter circuit 22A acquires an analog signal through the anti-aliasing filter 21A, and generates a digital signal (digital values). Also, A/D converter circuit 22B acquires an analog signal through the anti-aliasing filter 21B, and generates a digital signal (digital values).

Drive timeliness section (a differentiation element) 230A acquires a digital signal through A/D converter circuit 22A, and generates controlled variable HA. Drive timeliness section (a filter) 230B acquires a digital signal through A/D converter circuit 22B, and generates controlled variable HB.

Controlled variable HA from drive timeliness section (a differentiation element) 230A and controlled variable HB from drive timeliness section (a filter) 230B are sent to the driving signal generation circuit 24.

The driving signal generation circuit 24 outputs on-off signal DSW for switch to the power converter circuit 1.

Figure 9:
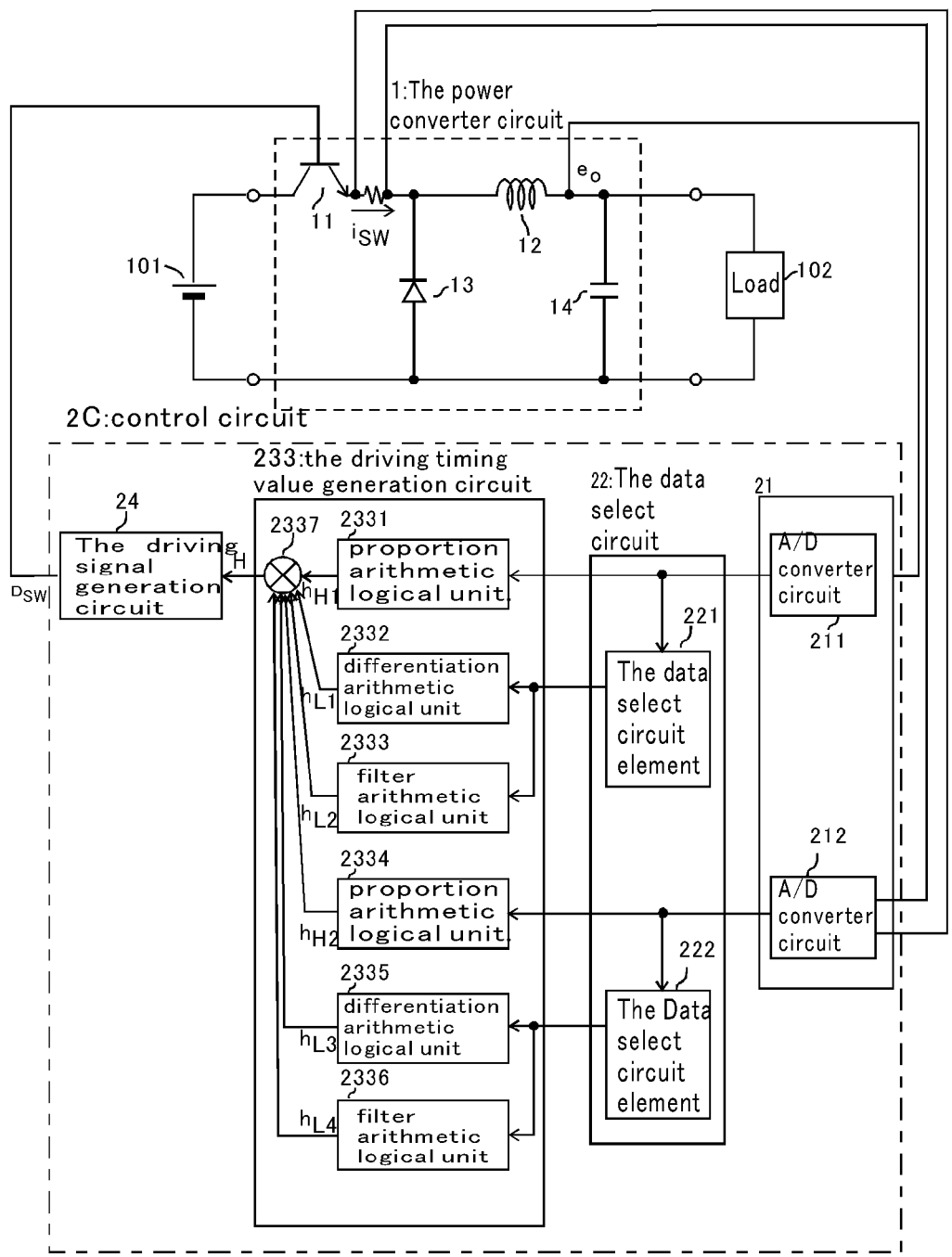
FIG. 9 is a configuration diagram which shows the third embodiment of the controller of the present invention.

Third embodiment of the present invention is described by FIG. 9. In FIG. 9, the configuration of the power converter circuit 1 is the same as the power converter circuit 1 shown in FIG. 1.

Also, it is first, and the controller 2 controls switch 11 by PWM in the third embodiment like second embodiment.

The controller 2 is comprised of the third embodiment by A/D converter circuit 22, data selective circuit 25, the driving timing value generation circuit 23 and the driving signal generation circuit 24.

A/D converter circuit 22 consists of A/D converter circuit element 221,222. Data selective circuit 25 consists of selecting data circuit element. The driving timing value generation circuit 23 becomes from proportion arithmetic figure 231, 234, differentiation arithmetic logical unit 232,235, filter arithmetic logical unit 233,236 and the digital adder circuit 237. However, the anti-aliasing filter is not illustrated.

In FIG. 9, by the anti-aliasing filter 21A, A/D converter circuit 22A and the driving timing value generation circuit 23A, analog signal SoA which is necessary for control is acquired from the power converter circuit 1. And, by the anti-aliasing filter 21B, A/D converter circuit 22B and the driving timing value generation circuit 23B, analog signal SoB which is necessary for control is acquired from the power converter circuit 1.

For example, in the third embodiment, analog signal SoA is an output voltage value.

By the anti-aliasing filter 21A, A/D converter circuit 22A and the driving timing value generation circuit 23A, a timing of the falling of the driving signal can be controlled.

Also, analog signal SoB is the current value which flows, for example, through the switch.

By the anti-aliasing filter 21B, A/D converter circuit 22B and the driving timing value generation circuit 23B, timeliness of the rising of the driving signal can be controlled.

Note that, in FIG. 9, data selective circuit is not comprised after A/D converter circuit 22A, 22B.

That is, in front of the driving timing value generation circuit 23A, 23B, data selective circuit is not comprised. However, the data selection circuit which illustrated by FIG. 3 can be made for A/D converter circuit 22A, a subsequent stage of 22B.

Figure 10:
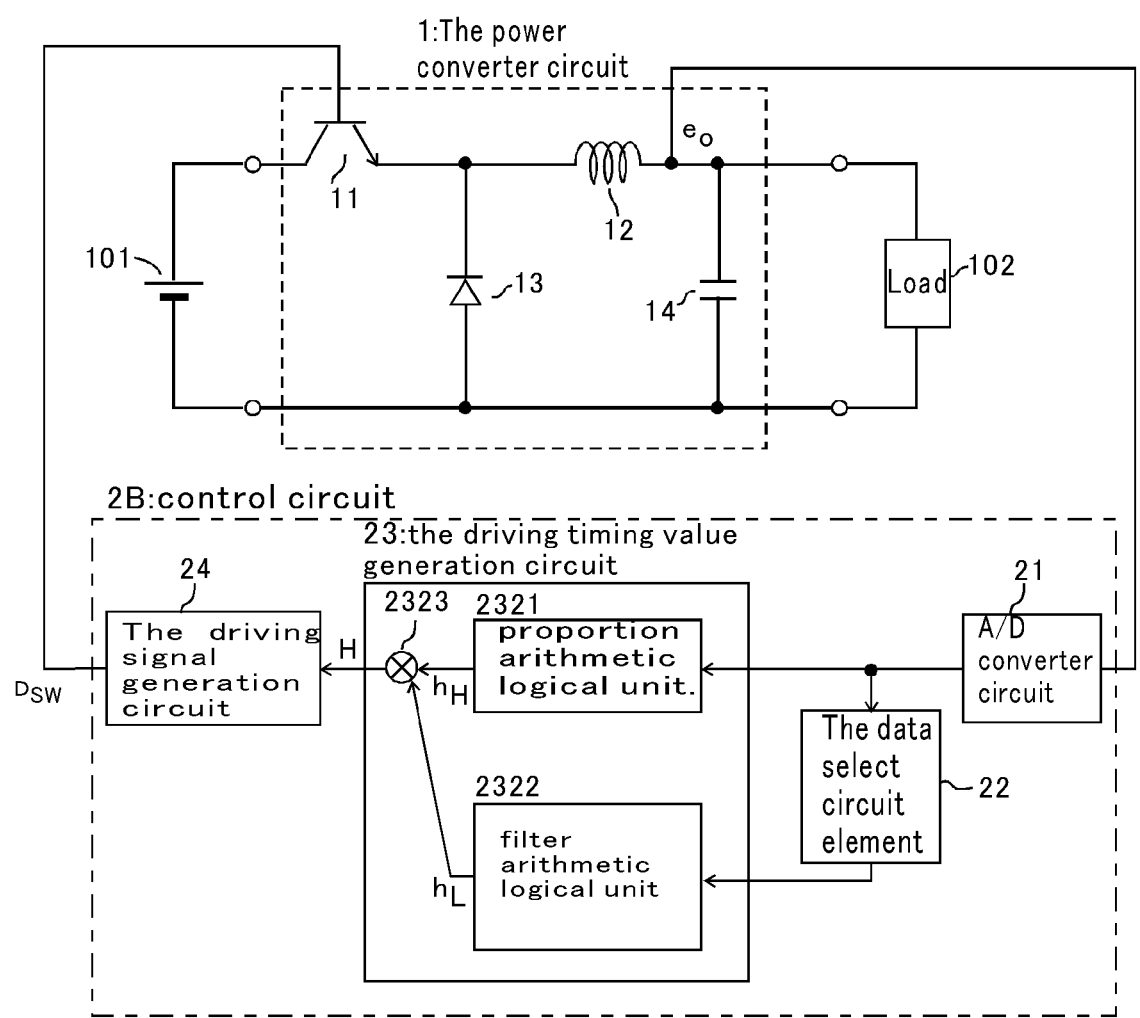
FIG. 10 is a configuration diagram showing a drive timing value generation circuit which comprises a filter arithmetic logical unit and a proportion arithmetic logical unit.
Figure 11:
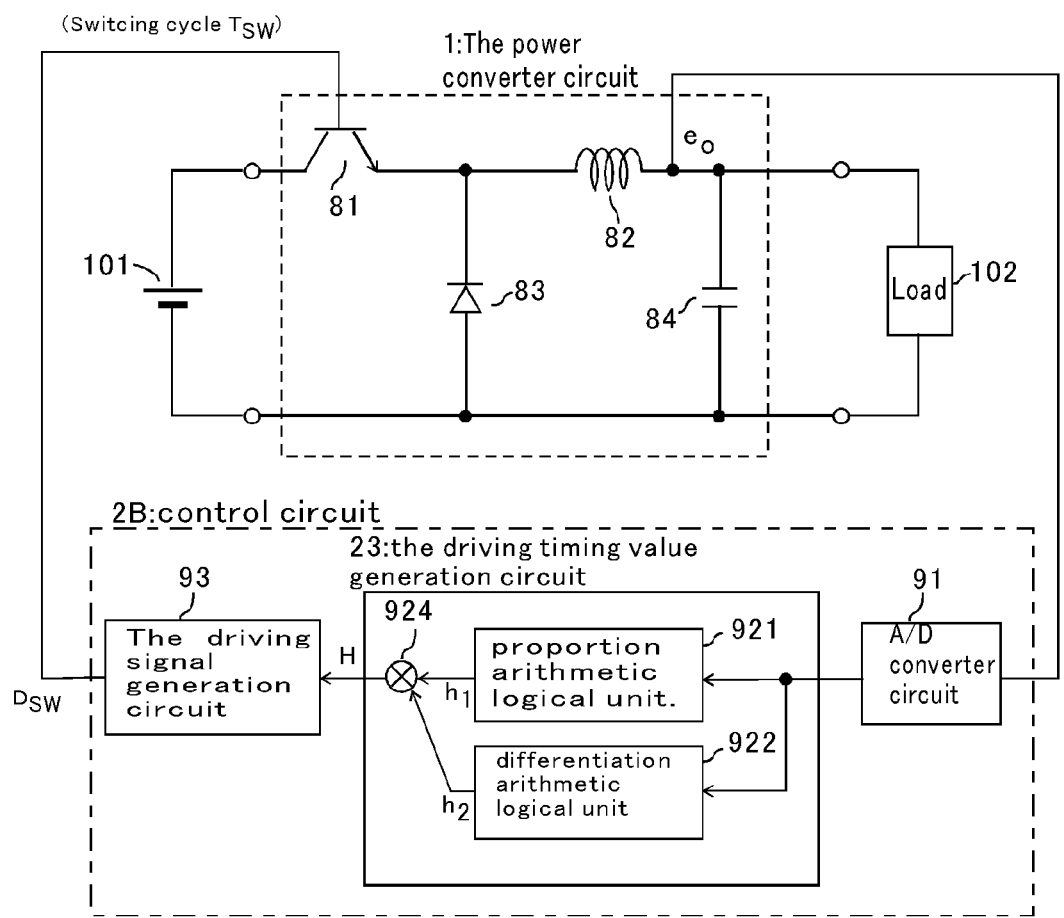
FIG. 11 is a configuration diagram which shows a conventional controller.

Note that, as shown in FIG. 10, drive timing value generation circuit can be comprised by filter arithmetic logical unit and proportion arithmetic logical unit.

The application of the filter of the present invention is described as follows.

FIG. 12 (A) is an illustration showing one embodiment of the digital circuit of the present invention.

In FIG. 12 (A), digital circuit 11A possesses moving average circuit 111A and differentiating circuit 112 and adder 113.

Here, moving average circuit 111A is the first filter circuit of the present invention. Differentiating circuit 112 is the second filter circuit of the present invention.

FIG. 12 (B) shows the following digital signal (discrete value).

... X (1), X (2), ..., X (M), ...

In FIG. 12 (B), time is shown as follows.

..., 1, 2, ..., M−1, M, ...

For example, digital values X is deviation of electric variable such as voltage, current, the electric power.

Digital values X is input, and moving average circuit 111A operates moving average MQ (n).

In moving average circuit 111A, phase delay of time n occurs.

Differentiating circuit 112 inputs digital values X. And differentiation level (quantity of compensation) CQ (n) of the phase delay is operated.

Adder Circuit 113 adds moving average MQ (n) and quantity of compensation CQ (n), and digital signal Dc (n) is generated.

Digital signal Dc (n) is the signal which phase delay was compensated for.

Note that, in FIG. 12 (A), a flow of the processing is shown, does not show the signal value of the all parts in a certain tick.

The difference equation in the sequential n time of moving average MQ is represented in formula 1.

$$MQ(n) = (1/M)\Sigma X(k) \quad (1)$$

However, $\Sigma X (k)$ is additional value to 1 k=−M, and M is measurement size. n is a coefficient corresponding to M in a sampling time.

A block diagram of moving average circuit 111A is shown in FIG. 13 (A).

In FIG. 13 (A), block Z−1 means that the digital values of the sampling before one are output.

The most tail end of moving average circuit 111A is provided with a coefficient multiplier circuit (1/M).

When X (n) is input into moving average circuit 111A, digital values X (M), X (M−1), ..., X (2), total value of X (1) are calculated. And (1/M) is multiplied by this total value.

The coefficient multiplier circuit can be provided in FIG. 12 (A) and FIG. 13 (A) after moving average circuit 111A and differentiating circuit 112 (it is not illustrated).

The coefficient multiplier circuit can be used together with moving average circuit 111A and differentiating circuit 11.

The example of the frequency characteristic of moving average circuit 111A is shown in FIG. 13 (B), and the example of the phase characteristic of moving average circuit 111A is shown in FIG. 13 (C). Phase delay occurs in the output of moving average circuit 111A in a practical use frequency spectrum to understand from FIG. 13 (B), (C).

Differentiating circuit 112 in FIG. 12 (A) has high pass properties.

Quantity of compensation CQ (n) in time n is represented in formula 2.

$$CQ(n) = (X(k) - X(k-1))/\Delta t \quad (2)$$

However, Δt is a time interval of the discrete value, and, for example, k is either value of 2–M. Also, n is a coefficient corresponding to M–1 here in a sampling time.

Note that time interval can be done, for example, with Δ2t when CQ (n) is a differentiation level using the discrete value line. That is, CQ (n) is represented in formula 3.

$$CQ(n)=(X(k)-X(k-2))/\Delta 2t \tag{3}$$

For example, k is either integer value of 2–M (or 3–M).

The example of the frequency characteristic of differentiating circuit 112 is shown in FIG. 14 (A), and the example of the phase characteristic of differentiating circuit 112 is shown in FIG. 14 (B).

As for the output of differentiating circuit 112, phase advances in 用周波数域 to understand from FIG. 13 (A), (B).

Moving average MQ (n) and quantity of compensation CQ (n) (output of differentiating circuit 112) add by Adder Circuit 113. The phase delay of moving average MQ (n) is thereby reduced by quantity of compensation CQ (n).

Figure 15:
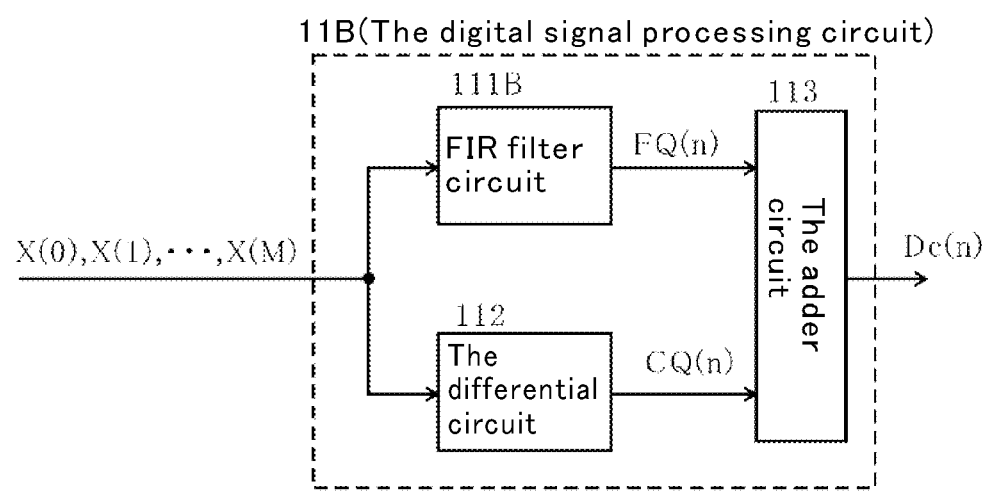
FIG. 15 is an illustration showing the other embodiments of the digital circuit of a present invention.

FIG. 15 is an illustration showing the other embodiments of the digital circuit of the present invention.

In FIG. 15, digital circuit 11B comprises finite impulse response filter circuit 111B and differentiating circuit 112 and Adder Circuit 113 and a coefficient multiplier circuit.

Here, moving average circuit 111B is the first filter circuit of the present invention.

Like a digital circuit of FIG. 1, differentiating circuit 112 is the second filter circuit of the present invention.

The difference equation of finite impulse response filter circuit 111B is represented in formula 4.

$$FQ(n)=\Sigma akX(k) \tag{4}$$

However, ΣakX (k) is additional value to 1 k=–M. M is measurement size, and ak is weighting factor. n is a coefficient corresponding to M in a sampling time.

Figure 16:
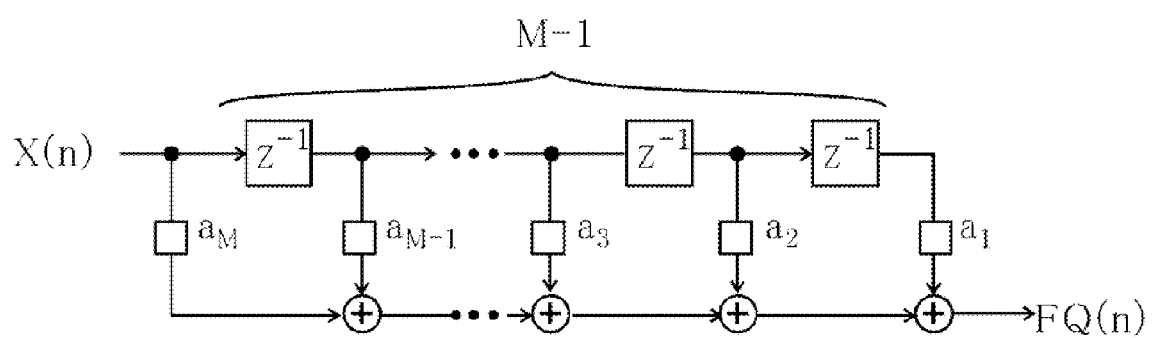
FIG. 16 is a block diagram of finite impulse response filter circuit.

FIG. 16 is a block diagram of finite impulse response filter circuit 111B.

In FIG. 16, block Z–1 outputs the digital values of the sampling before one.

A subsequent stage of block Z–1 is provided with a coefficient multiplier circuit (ak). When X (M) is input into finite impulse response filter circuit 111B, aMX (M), aM–1X (M–1), . . . , a2X (2), total value FQ (n) of a1X (1) are calculated.

It is not illustrated in FIG. 15, FIG. 16, but, like FIG. 1 (A), moving average circuit 111A of FIG. 13 (A), the coefficient multiplier circuit can be provided after finite impulse response filter circuit 111B and differentiating circuit 112.

A frequency characteristic of finite impulse response filter circuit 111B, the phase characteristic are similar to FIG. 13 (B), (C) (cf. moving average circuit 111A).

In output FQ (n) of finite impulse response filter circuit 111B, phase delay produces in a practical use frequency spectrum.

Compensation quantity CQ (n) in output of differentiating circuit 112 in FIG. 16 namely the sequential n time is represented in previously described formula 2.

Note that, like FIG. 1 (A), moving average circuit 111A of FIG. 13 (A), the coefficient multiplier circuit can be provided after finite impulse response filter circuit 111B and differentiating circuit 112. However, it is not illustrated in FIGS. 15 and 16.

In digital circuit 11B of FIG. 15, a phase advances to output CQ (n) of differentiating circuit 112 in a practical use frequency spectrum. Thus, in what Adder Circuit 113 adds output (quantity of compensation CQ (n)) of output FQ (n) and differentiating circuit 112 of finite impulse response filter circuit 111B to, the influence for the phase delay of FQ (n) is canceled by CQ (n).

Figure 17:
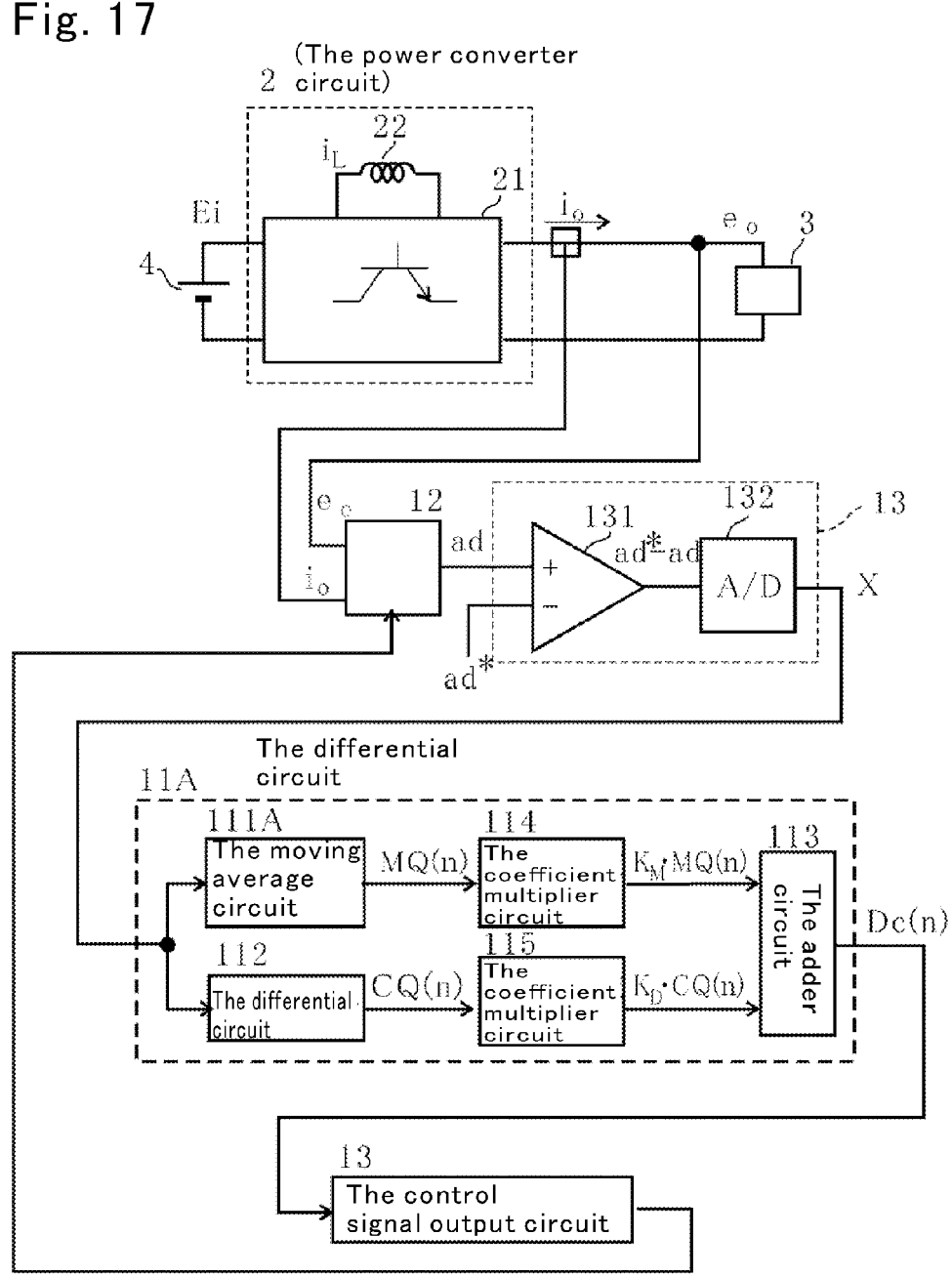
FIG. 17 is an illustration which shows an embodiment of the digital control circuit of the present invention.

FIG. 17 is an illustration which shows the embodiment of the digital control circuit of the present invention.

In this embodiment, an example controlling the power converter circuit by a digital control circuit based on digital circuit 11A of FIG. 1 is shown.

The digital control circuit can carry digital signal processing circuit 11B of FIG. 15. When the power converter circuit is controlled, the following discussion is just applied by this digital control circuit.

In FIG. 17, the power converter circuit 2 is comprised of reactor 22 connected to switching circuit 21 inputting voltage Ei from power supply 4 and switching circuit 21.

This reactor 22 performs accumulation of energy/emission.

Load 3 is connected to switching circuit 21.

Reactor 22 may be connected to switching circuit 21 between load 3 depending on a power conversion method.

Digital control circuit 1 comprises input element 12, input comparing element 13, digital signal processing circuit 11A and control signal output 14.

Input element 12 includes a signal select function, and either of output voltage $e_o$ and output current $i_o$ can be selected. Also, input element 12 can select both output voltage eo and output current $i_o$.

Digital control circuit 1 can control various kinds of modes.

For example, this mode is a constant voltage mode, a constant current mode, an electric power mode, an excess current limit mode or an over potential limit mode.

For example, input element 12 selects eo when digital control circuit 1 performs the control with the constant voltage mode.

However, when load current increases rapidly, input element 12 selects io, and digital control circuit 1 performs the control with the excess current restrictions mode.

Also, by the process when control mode switches over from a constant voltage mode to an excess current restrictions mode, input element 12 can select both sides of eo and io. In this case, digital control circuit 1 performs multiplication with eo and io, and the control with the electric power mode is performed.

Herein, output of input element 12 is assumed ad.

Note that it is not illustrated, but a voltage detection level may be mean value or effective value as well as instantaneous value (eo) (Eo).

Also, the current detection level is not limited to instantaneous value (io). A current detection level may be mean value or effective value (Io).

Input comparing element 13 after input element 12 consists of differential amplification 131 and analog-to-digital converter 132.

Differential amplifier 131 outputs difference (ad*–ad) with electric power detection level ad and command ad*. Analog-to-digital converter 132 converts this difference (ad*–ad) into a digital signal, and it is output to digital signal processing circuit 11 for a deviation (digital discrete value X).

In FIG. 17, analog-to-digital converter 132 is comprised after differential amplifier 131.

Differential amplifier 131 (in this case digital comparator) can be made after analog-to-digital converter 132.

Figure 18:
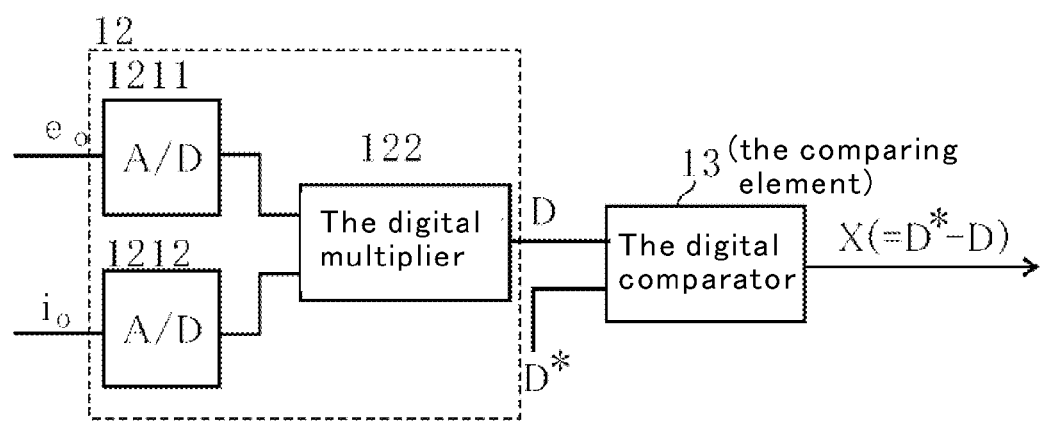
FIG. 18 is a configuration diagram of an input element and a comparing element.

Also, before input element 12, an A/D converter can be made. In this case, as shown in FIG. 18, input element 12 is analog-to-digital converter 1211, 1212 and digital multiplier 122, and comparing element 13 is digital comparator.

Output of digital multiplier 122 is shown in FIG. 16 in code D. Comparing element 13 inputs output D and command D*, and digital deviation D*–D is output as X.

Note that coefficient multiplier circuit 114 is comprised after moving average circuit 111A in FIG. 17, and it is provided with coefficient multiplier circuit 115 after differentiating circuit 112.

Digital signal processing circuit 11A comprises a part of the control circuit. Digital signal processing circuit 11A performs arithmetic processing of moving average MQ (n) of digital deviation DX.

Coefficient multiplier circuit 114 multiplies predetermined coefficient KM by MQ (n). And moving average manipulated variable KM*MQ (n) is output.

Differentiating circuit 112 performs arithmetic processing of differentiation level CQ (n) of digital deviation X.

Coefficient multiplier circuit 115 multiplies predetermined coefficient KD by CQ (n), and moving average manipulated variable KD*CQ (n) is output.

Adder Circuit 113 adds output differentiation value KD/CQ (n) of output KA/MQ (n) of coefficient multiplier circuit 114 and coefficient multiplier circuit 115, and signal Dc (n) which compensated for phase delay is output.

The circuit operating moving average can be comprised from a shift register as shown in FIG. 19 (A).

In FIG. 19 (A), as for the circuit operating moving average, it is from FIFO 1301 and adder 1302 and shift register 1303 and coefficient multiplier circuit 1304.

Sampling value is input sequentially, and, in FIG. 19 (A), FIFO 1301 stores a sequence of a plurality of sampling value. That is, in FIFO 1301, four sampling value X1 shown in FIG. 19 (B), X2, X3, X4 are memorized.

Sampling value X1, X2, X3, X4 memorized in FIFO 1301 are input into adder 1302. And adder 1302 outputs ΣXi (=X1+X2+X3+X4).

Also, coefficient multiplier circuit 1304 multiplies coefficient (including coefficient (¼) to average) KM/4 by ΣXi. And, shift register 1303, KM outputs ΣXi (quarter).

Note that it makes an addition result (e.g., a binary number: b1b2b3b4) shift to the lower side by shift register 1303 twice, and (X1+X2+X3+X4)/22 can be operated.

And coefficient KM is multiplied by output (X1+X2+X3+X4)/22 of shift register 1303, and MQ (n) may be output.

In this case, coefficient multiplier circuit 1304 integrally with shift register 1303 it can be comprised.

For example, it should make a binary number (a binary number: b1b2b3b4) in shift register 1303 further shift to 1 bit (3 bits), the lower side when coefficient KM is half.

When coefficient KM is 2, it should make the lower side shift a binary number (a binary number: b1b2b3b4) in shift register 1303 only as for 1 bit.

That is, it makes binary sequence shift to the 2 bits low order side, and this processing is the same as processing to make shift to 1 bit host side.

Differentiating circuit 112 can be comprised from FIFO1121 and subtraction circuit 1122 and coefficient multiplier circuit 1123.

Figure 20:
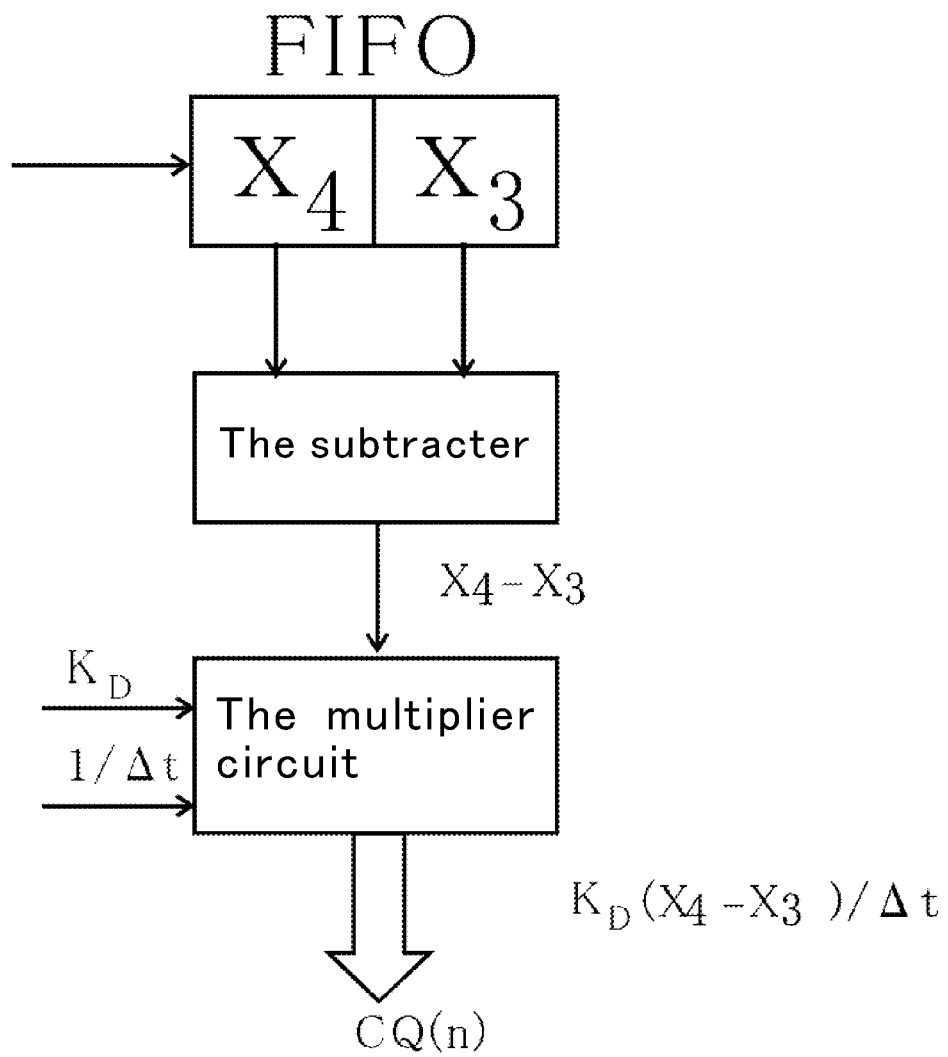
FIG. 20 is a configuration diagram of a differentiating circuit.

Two last value X3, X4 are input among X1, X2, X3, X4, and, in FIG. 20, FIFO1121 outputs these value to subtracting circuit 1122.

Subtracting circuit 1122 outputs this subtraction level (X3–X4) in coefficient multiplier circuit 1123. Coefficient multiplier circuit 1123 multiplies coefficient KD by a subtraction level (X3–X4), and differentiation level CQ (n) is output.

FIFO1121 of FIG. 20 can be shared with FIFO1301 of the moving average calculation circuit of FIG. 19 (A).

When load effect is not made, the digital control circuit of the present invention shows superior control characteristic. Even more particularly, the control that held a peak in check can be done when loads increased rapidly.

A transient characteristic of the reactor current when the power converter circuit 2 was simulated with a PID controller in FIG. 21 (A) is shown.

A transient characteristic of the reactor current when the power converter circuit 2 was simulated with digital control circuit 1 in FIG. 21 (B) is shown.

The overshoot when a reactor electric current flows is big in FIG. 21 (A).

Because parameter KM and KD are suitably chosen in FIG. 21 (B), an overshoot is restrained.

EXPLANATIONS OF THE LETTERS OF NUMERALS

1 the power converter circuit
2 the controllers
11 the switch
22 the reactor
13 the commutation diodes
14 the smoothing capacitor
21, 21A, 21B the anti-alias filters
22, 22A, 22B the A/D converter circuit
23, 23A, 23B the drive timing value generation circuit
24 the driving signal generation circuit
25 the data selective circuits
231 the control variable calculation circuit
232 the digital adder circuit
2311 the first arithmetic logical units
2312 the second arithmetic logical units
PRP proportion controlled variable arithmetic logical unit
DIF differentiation controlled variable arithmetic logical unit

The invention claimed is:

1. A controller of a power converter circuit comprising an A/D converter circuit, a drive timing value generation circuit and a driving signal generation circuit, wherein, the A/D converter circuit acquires one or more analog signals necessary for control from the power converter circuit, and generates one or more digital signals (digital values) corresponding to the analog signals by performing A/D conversion of the analog signals, the drive timing value generation circuit includes a control variable arithmetic circuit and a digital adder circuit, the control variable arithmetic circuit comprises a first arithmetic logical unit performing differentiation controlled variable arithmetic and a second arithmetic logical unit performing filter arithmetic, wherein each arithmetic logical unit inputs the digital signals and performs each arithmetic respectively, the digital adder circuit adds a controlled variable generated by the first arithmetic logical unit and a controlled variable generated by the second arithmetic logical unit in a repetition interval longer than a repetition interval of the first arithmetic logical unit and shorter than a repetition interval of the second arithmetic logical unit, and generates a drive timing value for driving a switch in the power converter circuit, and the driving signal generation circuit inputs the drive timing value and generates the drive signal of the switch from the drive timing value.

2. A controller for the power converter circuit according to claim 1, wherein the digital adder circuit starts adding when the differentiation controlled variable arithmetic logical unit generated the controlled variable.

3. A controller for the power converter circuit according to claim 1, wherein the first arithmetic logical unit performs differentiation controlled variable arithmetic and proportion controlled variable arithmetic.

4. A controller for the power converter circuit according to claim 1, wherein the driving signal generation circuit generates one or both of rising signal and falling signal of the driving signal.

5. A controller for the power converter circuit according to claim 1, wherein the power converter circuit is a DC/DC converter comprising the switch, a flywheel diode and a reactor.

6. A controller for the power converter circuit according to claim 2, wherein the first arithmetic logical unit performs differentiation controlled variable arithmetic and proportion controlled variable arithmetic.

7. A controller for the power converter circuit according to claim 2, wherein the driving signal generation circuit generates one or both of rising signal and falling signal of the driving signal.

8. A controller for the power converter circuit according to claim 2, wherein the power converter circuit is a DC/DC converter comprising the switch, a flywheel diode and a reactor.

* * * * *